US006962355B2

(12) United States Patent
Kwon

(10) Patent No.: US 6,962,355 B2
(45) Date of Patent: *Nov. 8, 2005

(54) ACTIVE TOE ANGLE ADJUSTMENT MECHANISM

(75) Inventor: Byoung Soo Kwon, Pyungtaek-si (KR)

(73) Assignee: Mando Corporation (KR)

( * ) Notice: Subject to any disclaimer, the term of this patent is extended or adjusted under 35 U.S.C. 154(b) by 53 days.

This patent is subject to a terminal disclaimer.

(21) Appl. No.: 10/373,326

(22) Filed: Feb. 24, 2003

(65) Prior Publication Data

US 2003/0209866 A1 Nov. 13, 2003

(30) Foreign Application Priority Data

| May 8, 2002 | (KR) | 10-2002-25193 |
| May 8, 2002 | (KR) | 10-2002-25194 |
| May 8, 2002 | (KR) | 10-2002-25191 |

(51) Int. Cl.⁷ ............................................. B62D 17/00
(52) U.S. Cl. ............................ 280/86.75; 280/5.522
(58) Field of Search .................... 280/5.522, 5.52, 280/5.521, 86.75, 86.757, 86.758

(56) References Cited

U.S. PATENT DOCUMENTS 4,835,714 A * 5/1989 Sano et al. ............... 280/5.521

5,117,700 A * 6/1992 Trechsel ................... 74/89.24
5,292,149 A * 3/1994 Luger ....................... 280/5.522
5,700,025 A   12/1997 Lee
6,240,797 B1 * 6/2001 Morishima et al. ......... 188/134

FOREIGN PATENT DOCUMENTS

| EP | 0 439 207 A2 | 7/1991 | |
| FR | 2 561 193 | 9/1985 | |
| JP | 04031113 A * | 2/1992 | ............ B60G/7/00 |
| JP | 10218008 A * | 8/1998 | ............ B62D/17/00 |

* cited by examiner

Primary Examiner—Peter C. English
(74) Attorney, Agent, or Firm—Anderson Kill & Olick, PC

(57) ABSTRACT

A toe angle adjustment mechanism includes an electrical linear actuator, a control lever, and an interconnection arm, wherein the electrical linear actuator is mounted on a rear cross member of a vehicle having a pair of rear wheels. The control lever, pivotally attached to the rear cross member, pivotally interconnects the electrical linear actuator with the interconnection arm, which is pivotally connected with a steering knuckle rotationally coupled with a corresponding rear wheel. The electrical linear actuator includes a housing, a motor, a ball screw rotated by the motor, a ball nut operatively mounted on the ball screw for linear movement therealong in response to rotation of the ball screw by the motor, and an actuator rod attached to the ball nut.

7 Claims, 9 Drawing Sheets

ACTIVE TOE ANGLE ADJUSTMENT MECHANISM

FIELD OF THE INVENTION

The present invention relates to an active toe angle adjustment mechanism for a vehicle; and, more particularly, to an active toe angle adjustment mechanism employing an electrical linear actuator for actively adjusting a toe angle of rear wheels in a vehicle.

BACKGROUND OF THE INVENTION

A vehicle suspension system is to provide a comfortable ride to a vehicle passenger and improve a driving performance of the vehicle. To the purpose, the vehicle should be effectively shielded from the impact of the force generated from an irregular surface condition, whereby a vehicle operator keeps the vehicle under control comfortably, maintaining a good grip and getting a good feedback from the vehicle.

Such a vehicle suspension system has been developed to better the passenger's comfort and improve the driving performance of the vehicle by employing an active toe angle adjustment mechanism. A difference between a steer angle of an inside wheel and that of an outside wheel defines the toe angle. The active toe angle adjustment mechanism controls the toe angle therebetween. Such an active toe angle adjustment mechanism is recently adopted for rear wheels as well as front wheels of a vehicle. FIG. 1 shows a suspension system employing a conventional toe angle adjustment mechanism for a rear wheel 1.

Rotationally coupled to the rear wheel 1 is a steering knuckle 2, which is pivotally connected with a first control arm 4, a second control arm 6, and a trailing arm 8. Arranged generally longitudinal to the vehicle is the trailing arm 8 and traverse to the longitudinal centerline thereof are the first control arm 4 and the second control arm 6. The second control arm 6, used for adjusting the steer angle of the rear wheel 1, is connected with a hydraulic linear actuator 7 having a fixing rod 10, which is pivotally connected with a rear cross member (not shown) of a vehicle body (not shown).

The suspension system further includes a shock absorber 5 and a spring 3 assembled together to vertically support the steering knuckle 2. The shock absorber 5 mounted between the steering knuckle 2 and the vehicle body, together with the spring 3, serves to dampen vertical vibration of the vehicle body.

FIG. 2 illustrates the hydraulic linear actuator 7, which includes a cylinder 11, a cap 12, a piston rod 13, a piston 14, and the fixing rod 10. The cylinder 11 has an open end hermetically covered by the cap 12 and a closed end integrally formed with the fixing rod 10. One end of the piston rod 13 hermetically passes through the cap 12 and coupled with the piston 14 disposed inside the cylinder 11, while the other end thereof is connected with the second control arm 6. The piston 14 partitions an inner space of the cylinder 11 into a first chamber 17 and a second chamber 18.

Respectively disposed near the closed end and the sealed end of the cylinder 11 are a first port 15 and a second port 16. Hydraulic pressure is applied to the piston 14 selectively via the first or the second port 15 and 16. The piston 14 while being in equilibrium is sustained at the center of the cylinder 11 by a first and a second elastic member 19 and 20, which are disposed at the first chamber 17 and the second chamber 18, respectively.

The hydraulic pressure applied selectively via the first or the second port 15 and 16 is adjusted by using a hydraulic valve 21, which is electrically controlled by an electronic control unit (ECU). Based on a signal from a steering angle sensor 23 and/or a vehicle speed sensor 22, e.g., a speedometer, the ECU controls the operation of the hydraulic valve 21. That is to say, the speed sensor 22 and the steering angle sensor 23 provide feedback information on the vehicle's driving condition to the ECU, which in turn controls the hydraulic valve 21 such that the hydraulic linear actuator 7 can actively adjust the toe angle of the rear wheel 1.

The above-explained conventional toe angle adjustment mechanism employing the hydraulic linear actuator can be problematic in that the hydraulic units, i.e., the hydraulic linear actuator, occupy relatively large space and yield slow response time. Further, such a hydraulic control system can be fairly complex, involving relatively large number of complicated parts, and, therefore, limiting a production yield.

SUMMARY OF THE INVENTION

It is, therefore, a primary object of the present invention to provide a toe angle adjustment mechanism employing an electrical linear actuator that can reduce the response time as well as the occupation of space.

In accordance with a preferred embodiment of the present invention, there is provided a toe angle adjustment mechanism for a vehicle having a rear cross member, a pair of rear wheels, and a pair of steering knuckles, the mechanism including: an electrical linear actuator fixedly connected to the rear cross member; an interconnection arm pivotally connected with one of the steering knuckles, each of the knuckles being rotationally coupled with a corresponding rear wheel; and a control lever, rotationally attached to the rear cross member, for interconnecting the interconnection arm and the electrical linear actuator, wherein the electrical linear actuator selectively projects or retracts the control lever, which in turn is rotated about a rotary axis thereof so as to correspondingly retract or project the interconnection arm for the purpose of an active adjustment of a toe angle of the rear wheels.

The electrical linear actuator preferably includes a housing; an electrical motor attached to an end portion of the housing; a ball screw disposed inside the housing and rotated by the motor; a ball nut operatively mounted on the ball screw for linear movement therealong in response to a rotation of the ball screw by the electrical motor; and an actuator rod attached to the ball nut.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENT

Figure 1:
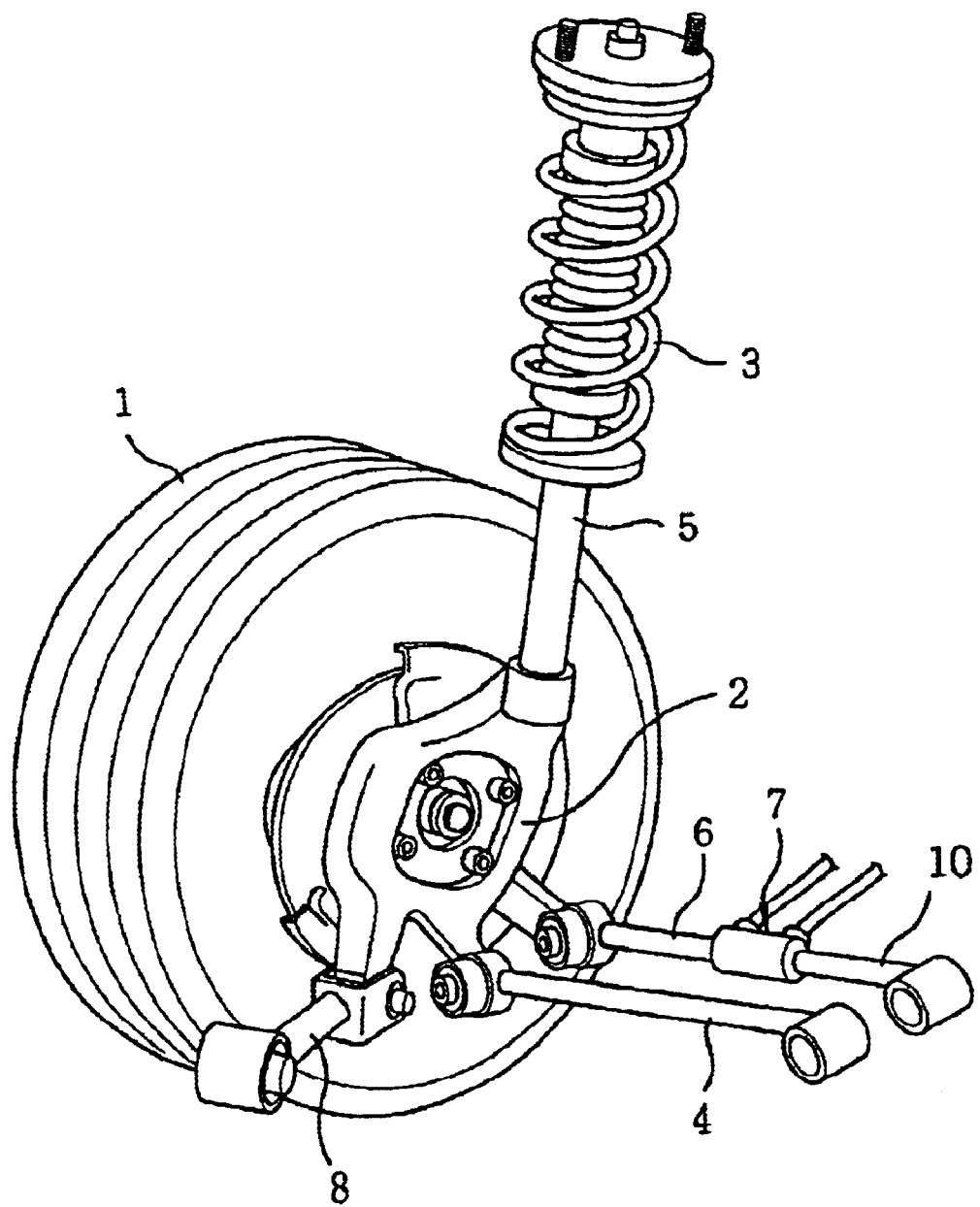
FIG. 1 presents a perspective view of a conventional toe angle adjustment mechanism employing a hydraulic linear actuator.
Figure 2:
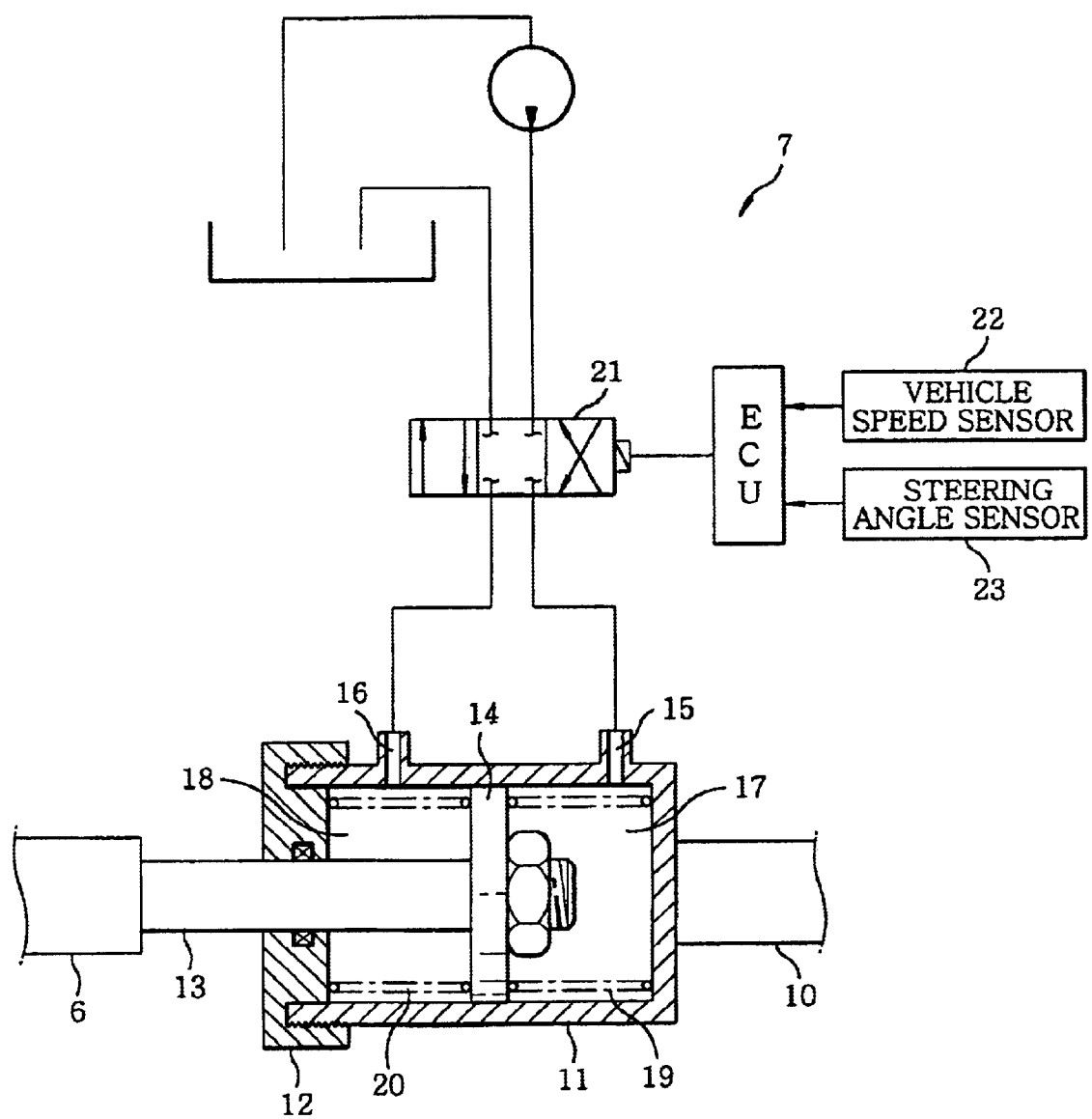
FIG. 2 provides a sectional view of the hydraulic linear actuator shown in FIG. 1 and a control system therefor.

Referring now to FIGS. 3 to 9, a toe angle adjustment mechanism 100 employing an electrical linear actuator in accordance with a preferred embodiment of the present invention will be described in detail. Like numerals represent like parts in the drawings.

Figure 3:
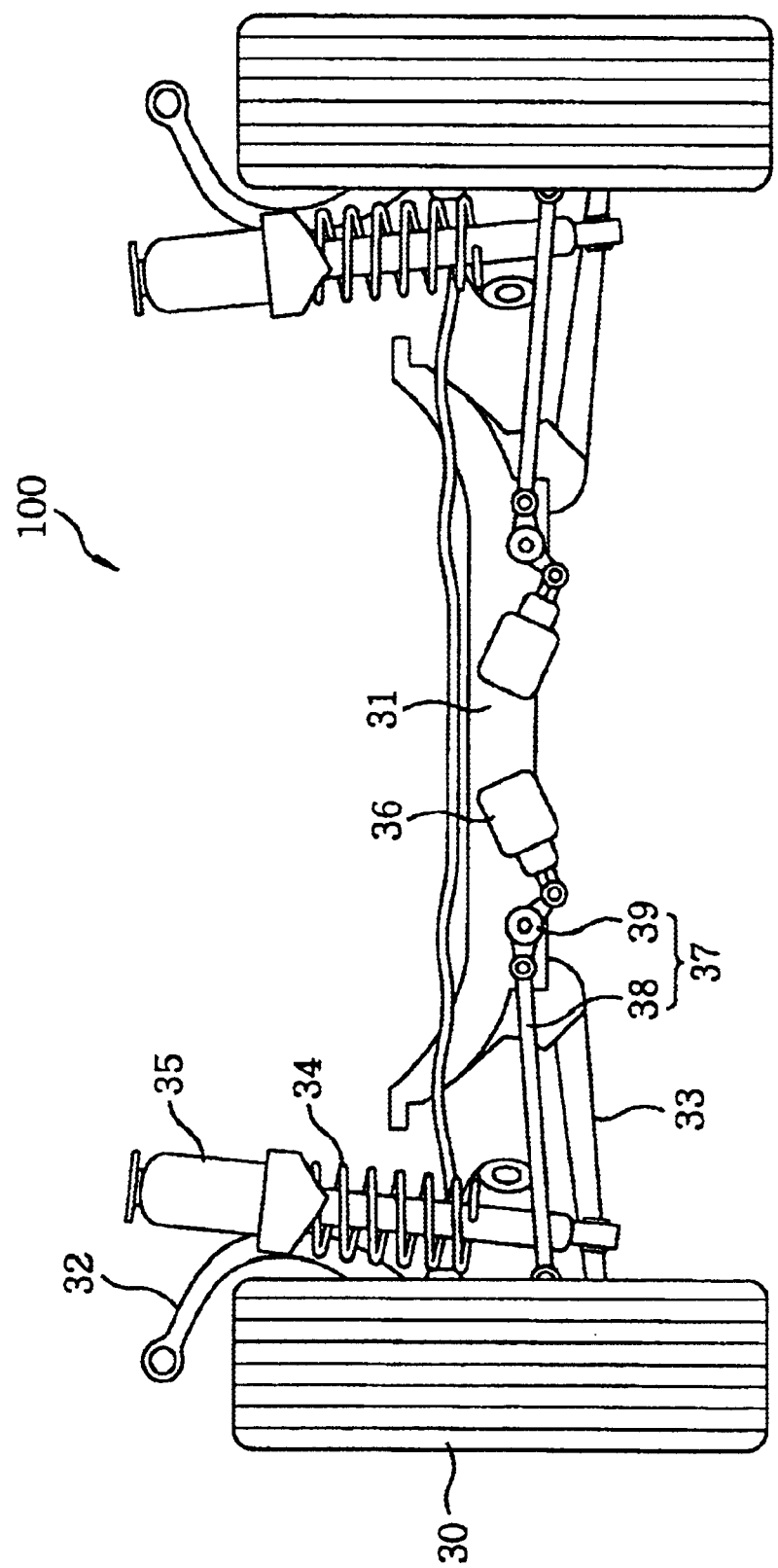
FIG. 3 represents a front view of a toe angle adjustment mechanism in accordance with a preferred embodiment of the present invention.

In FIG. 3, the toe angle adjustment mechanism 100 of a suspension system for a vehicle includes a pair of rear wheels 30, a rear cross member 31, a pair of steering knuckles 32, a pair of control arms 33, a pair of electrical linear actuators 36, and a pair of linkages 37. Each of the rear wheels 30 is rotationally coupled with a corresponding steering knuckle 32, which is pivotally connected with the control arm 33 and a trailing arm (not shown). The trailing arm supports the steering knuckle 32 that is longitudinal to the vehicle, and the control arm 33, traverse to the longitudinal centerline thereof. The suspension system further includes a spring 34 and a shock absorber 35 assembled together to vertically support the vehicle against each steering knuckle 32, whereby a vertical vibration of the vehicle is dampened.

The linkage 37, serving to interconnect the steering knuckle 32 and the electrical linear actuator 36, has an interconnection arm 38 and a control lever 39 pivotally connected together. The steering knuckle 32 and the electrical linear actuator 36 are pivotally connected with the interconnection arm 38 and the control lever 39, respectively, wherein a middle point of the control lever 39 is pivotally mounted on a low front portion of the rear cross member 31. The electrical linear actuator 36 selectively projects or retracts the control lever 39, which in turn is rotated about a rotary axis thereof, so that the interconnection arm 38 is correspondingly retracted or projected for the purpose of an active adjustment of the toe angle of the rear wheels 30.

Figure 4:
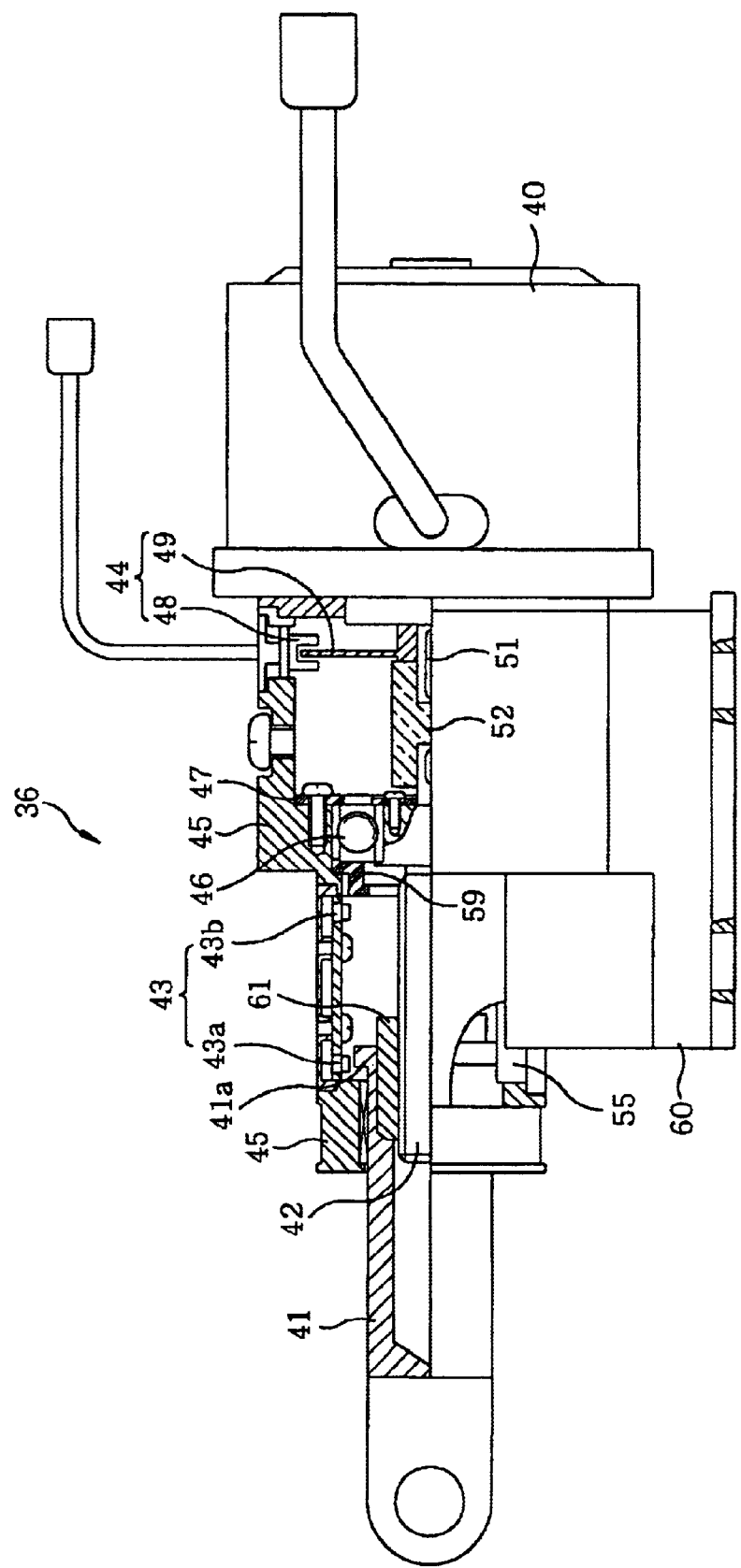
FIG. 4 is a partial cross-sectional view of an electrical linear actuator of the toe angle adjustment mechanism in accordance with the preferred embodiment of the present invention.

Referring to FIG. 4, there is illustrated the electrical linear actuator 38 including a direct current (DC) motor 40, a ball nut 61, an actuator rod 41, a ball screw 42, a couple of limit switches 43, a rotation detector 44, and a housing 45. The DC motor 40 is mounted on an end of the housing 45 and a drive shaft 51 thereof is connected with the ball screw 42 inside the housing 45. The couple of limit switches 43 with a predetermined interval therebetween are positioned above the ball screw 42. The rotation detector 44 has a disk 49 and a position sensor 48, which in the preferred embodiment is in the form of a photo-interrupter well known to those skilled in the art. Further, the electrical linear actuator 36 is assembled on a bracket 60, wherein the bracket 60 serves to mount the electrical linear actuator 36 on the rear cross member 31 of FIG. 3.

The ball nut 61 is operatively mounted on the ball screw 42 for linear movement therealong in response to a rotation of the ball screw 42 by the DC motor 40. The actuator rod 41 attached to the ball nut 61 simultaneously linearly moves together with the ball nut 61. If a pitch of the ball screw 42 is about 2 mm, the actuator rod 41 correspondingly moves about 2 mm per each rotation of the ball screw 42. The ball nut 61 and the actuator rod 41 may be integrally formed as one body structure.

The couple of limit switches 43, i.e., a first and a second limit switch 43a and 43b, serve to preset a stroke of the electrical linear actuator 36 by detecting a first protrusion 41a of the nut actuator rod 41, so that an optimum operation thereof can be assured. The first protrusion 41a is positioned on an end portion of the actuator rod 41. Each of the limit switches 43 is a photo-sensor or preferably a gap sensor and can be used to set a reference position of the actuator rod 41 or compensate errors of the rotation detector 44.

The electrical linear actuator 36 may be operated by applying a direct-current voltage ranging from about 10 to about 16 V. With a predetermined input voltage of about 13.5 V applied thereto, it is preferred that the electrical linear actuator 36 is capable of operating at a speed of about 105 mm/s with a load of about 20 Kgf or at about 65 mm/s with about 60 Kgf, wherein the load acts on the actuator rod 41 along a longitudinal axis thereof. On the other hand, the electrical linear actuator 36 is preferably capable of withstanding an external axial force of about 260 Kgf acting on the actuator rod 41. These specifications of the electrical linear actuator 36 are determined by the type of vehicle employing the toe angle adjustment mechanism 100. Further, the electrical linear actuator 36 may include a powder brake (not shown) for locking the actuator rod 41.

The electrical linear actuator 36 further includes a bearing 46 fixed in the housing 45 by a bearing stopper 47. One end of the ball screw 42 is of a non-threaded shape to be forcibly inserted into an inner part of the bearing 46, which smoothes rotation of the ball screw 42. The inner part of the bearing 46 rotates together with the ball screw 42, while an outer part thereof is fixedly connected to the housing 45. Furthermore, a rod stopper 59 is installed near the bearing 46 inside the housing 45 to mechanically prevent the actuator rod 41 from proceeding beyond the second limit switch 43b.

Figure 5A:
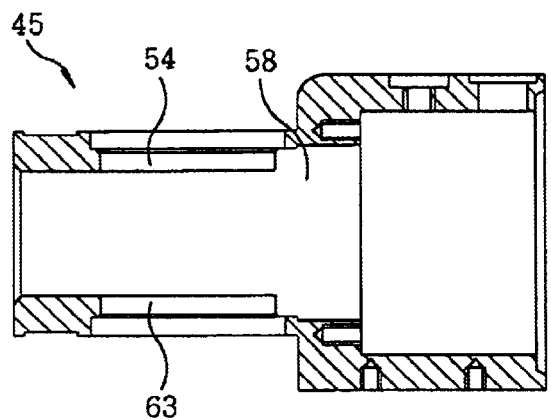
FIG. 5A shows a cross-sectional front view of a housing of the electrical linear actuator shown in FIG. 4.
Figure 5B:
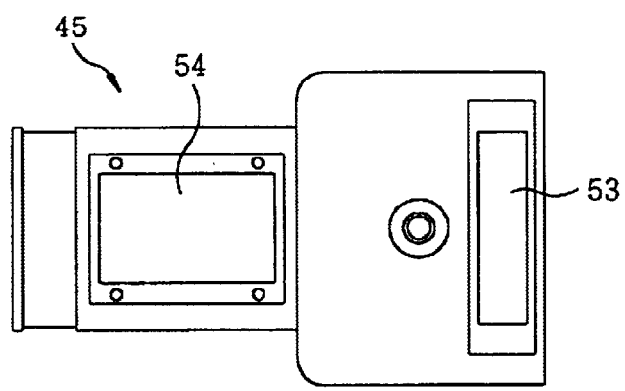
FIG. 5B describes a plan view of the housing shown in FIG. 4.
Figure 5C:
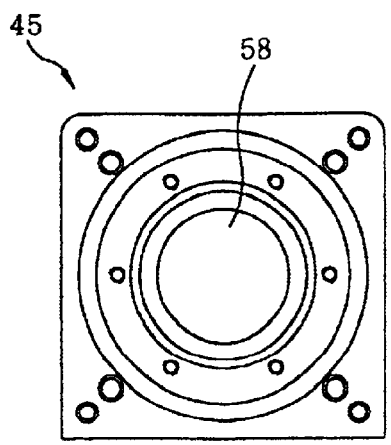
FIG. 5C illustrates a side view of the housing shown in FIG. 4.

FIGS. 5A to 5C show various views of the housing 45. Referring to FIGS. 4 and 5A to 5C, the configuration of the electrical linear actuator 36 will be explained in more detail.

The housing 45 has therein a hollow portion 58 extending along a longitudinal center axis of the housing 45. The ball screw 42 assembled with the ball nut 61 and the bearing 46 is positioned in the hollow portion 58 and the DC motor 40 is mounted on the end of the housing 45. The non-threaded end portion of the ball screw 42 is forcibly inserted into the bearing 46 and is coupled with the drive shaft 51 of the DC motor 40 via a coupling element 52.

Formed through an upper side of the housing 45 are a first opening portion 53 and a second opening portion 54, and formed through a lower side thereof is a third opening portion 63. The first opening portion 53 and the second opening portion 54 are positioned at an end region and a middle region of the upper side, respectively, and the third opening portion 63 is positioned at a middle region of the lower side to oppositely face the second opening portion 54.

Figure 6:
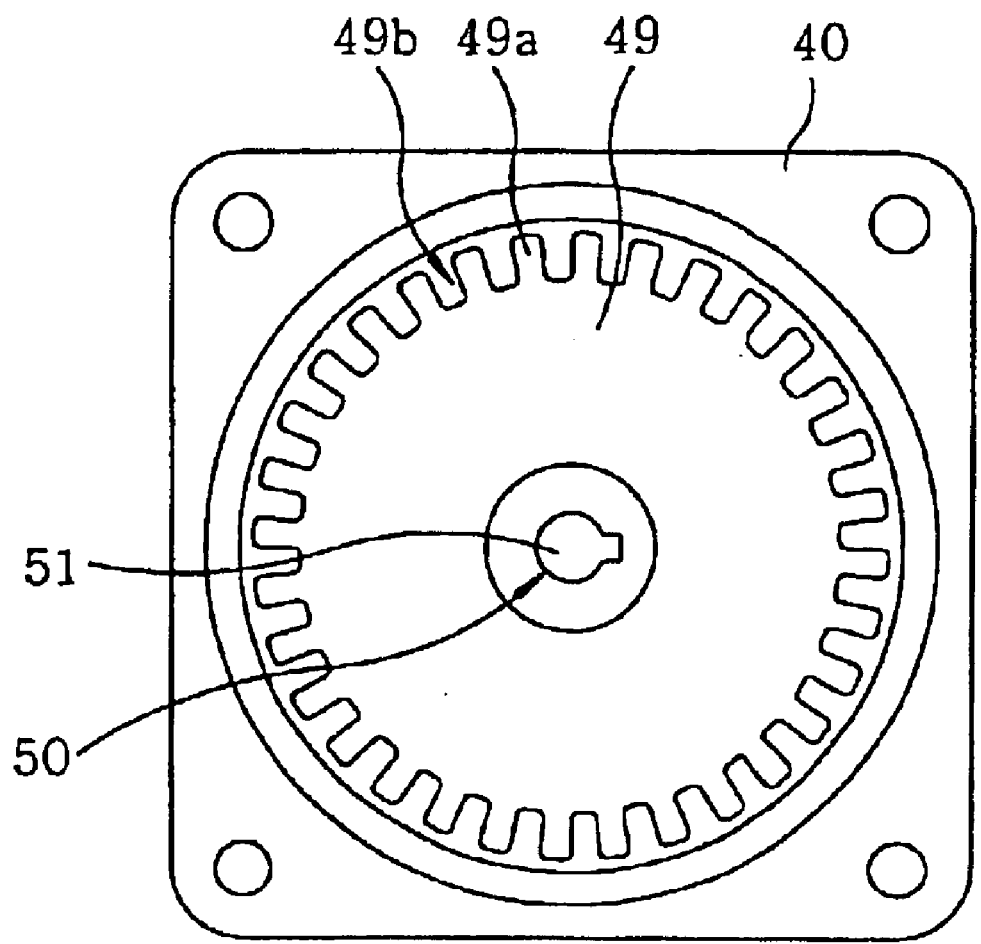
FIG. 6 sets forth a rotation detector of the toe angle adjustment mechanism in accordance with the preferred embodiment of the present invention.

The first opening portion 53 is used to install the position sensor 48 against the disk 49. FIG. 6 illustrates a front view of the disk 49 coupled with the drive shaft 51 of the DC motor 40 at a center hole 50 thereof. The disk 49 has a multiplicity of alternating teeth 49a and slits 49b equally spaced around a circumference thereof. The position sensor 48 includes a light source (not shown) and a photo-detector (not shown) disposed near the circumference of the disk 49 where the teeth 49a and the slits 49b are provided. Therefore, while the DC motor 40 is rotating, the position sensor 48 continuously detects each interruption of light and correspondingly outputs a pulse signal such that rotating angle of the drive shaft 51, i.e., the ball screw 42 of FIG. 4, can be obtained. The output of the position sensor 48 serves to monitor the amount of rotation of the ball screw 42 to be used to control the toe angle.

Figure 7:
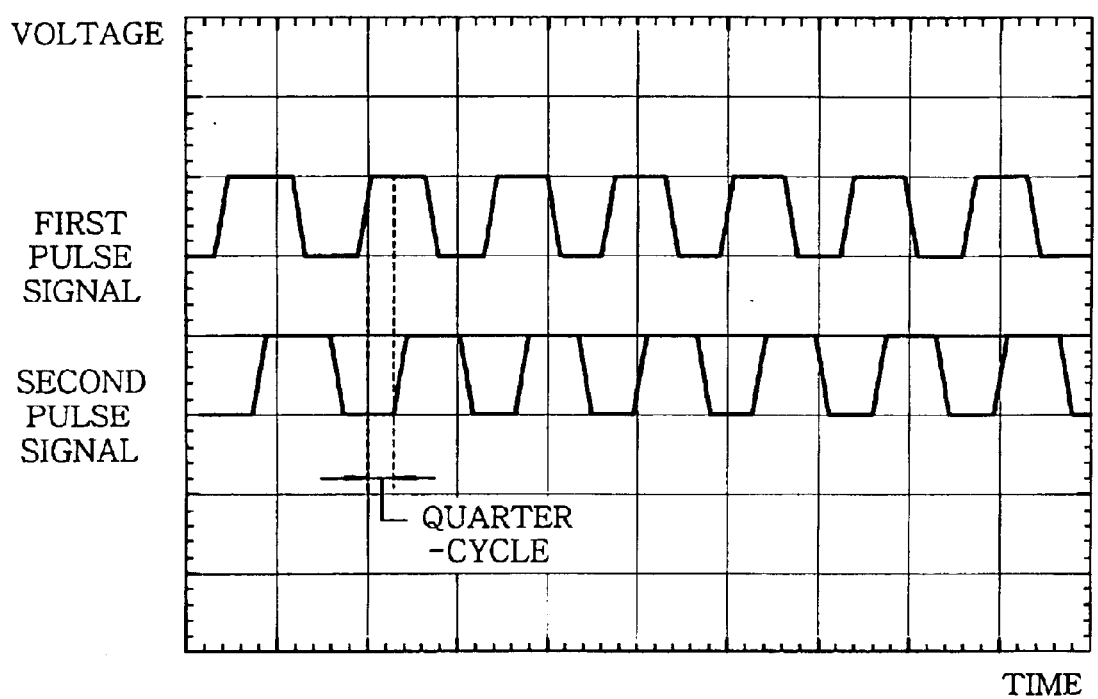
FIG. 7 is a graph illustrating exemplary output signals detected from the rotation detector of FIG. 6.

Employing two position sensors can improve a resolving power of the rotation detector 44. FIG. 7 shows an exemplary graph obtained from a first and a second pulse signal respectively generated from a first and a second position sensor, which are preferably installed such that the first and the second pulse signal are out of phase by a quarter-cycle.

Under the above-explained condition, uniformly distributed 32 slits at one revolution of the disk can provide a resolving power of about 2.81258° [=360°/(32*2*2)] for the DC motor. At this resolving power, a controllable unit displacement of the actuator rod 41 can be set to about 0.0156 mm (=2 mm*2.8125°/360°) when the ball screw 42 has a pitch of about 2 mm.

Returning to FIGS. 4 and 5A to 5C, the second opening portion 54 is used to install the first limit switch 43a and the second limit switch 43b that respectively set a first end point and a second end point of a stroke of the actuator rod 41. Further, the third opening portion 63 is used to install a guide 55, which serves to prevent rotation of the actuator rod 41 so as to secure linear movement thereof.

Figure 8:
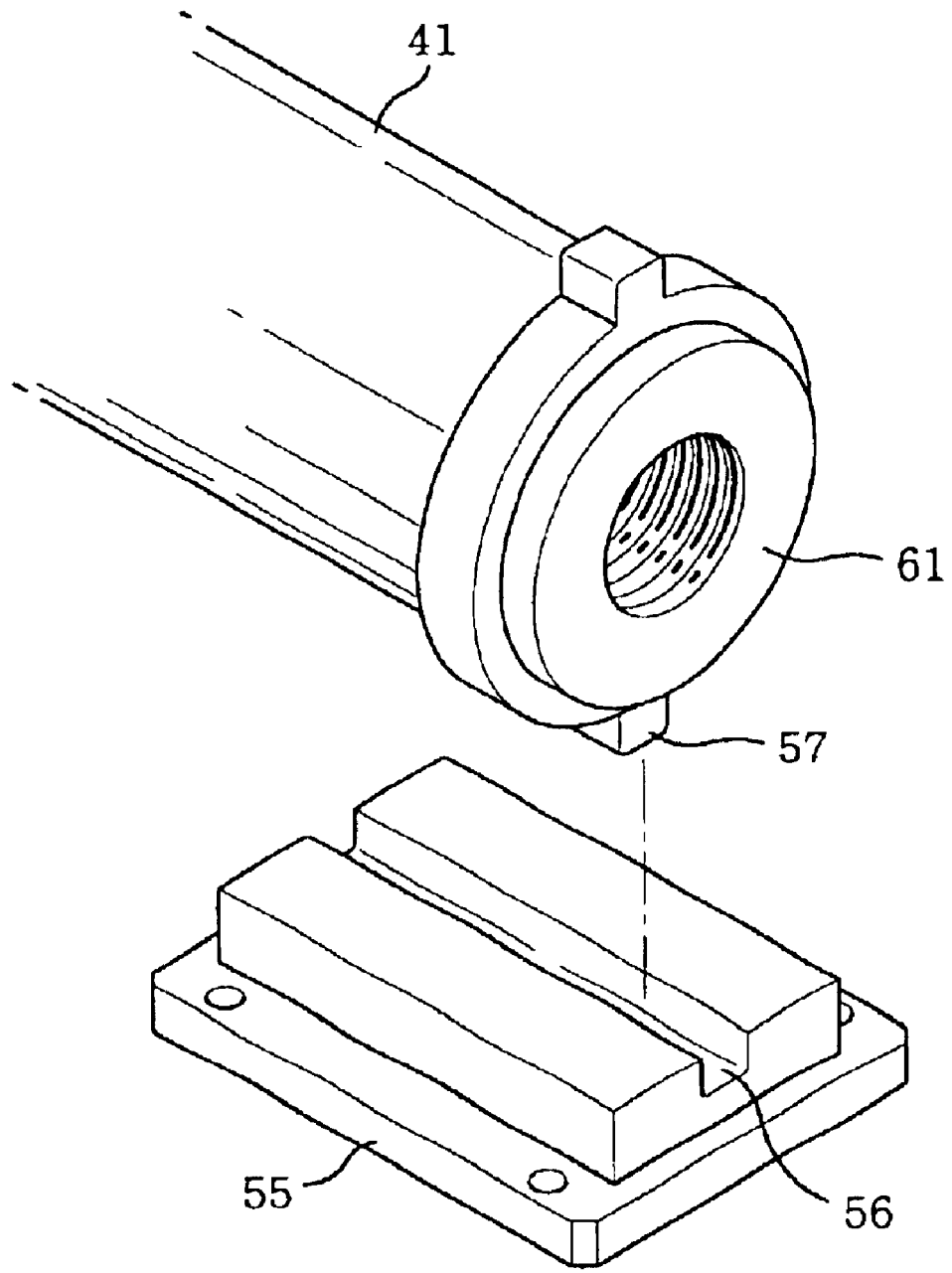
FIG. 8 depicts a perspective view of an actuator rod and a guide of the electrical linear actuator in accordance with the preferred embodiment of the present invention.

FIG. 8 shows an assembly configuration of the guide 55 and the actuator rod 41. The guide 55 has a groove 56 formed along a centerline thereof and the actuator rod 41 has a second protrusion 57 positioned on an outer circumference thereof, wherein the second protrusion 57 can smoothly slide along the groove 56. The guide 55 and the second protrusion 57 serve to prevent any rotation of the actuator rod 41 while the ball screw 42 of FIG. 4 is rotating, so that the actuator rod 41 can provide an accurate linear motion between the first end point and the second end point.

Figure 9:
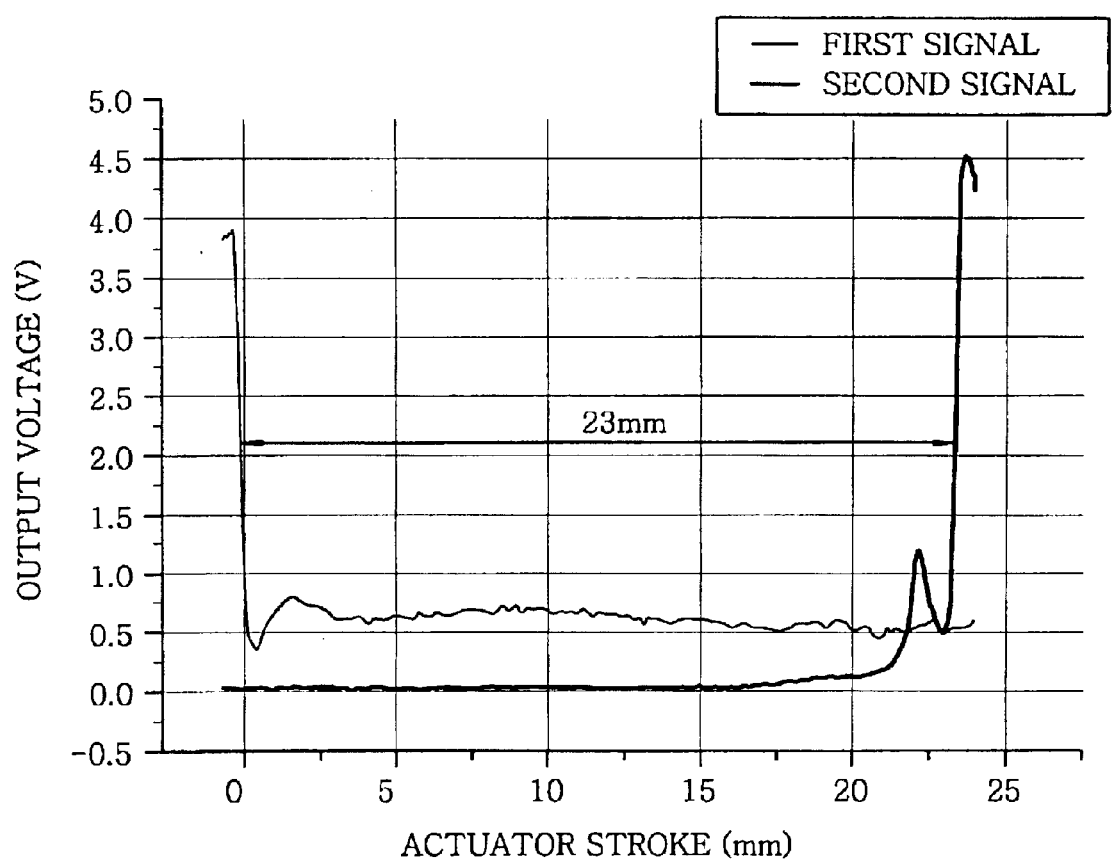
FIG. 9 is a graph presenting exemplary output signals detected from a pair of limit switches.

FIG. 9 shows a graph of signals outputted from the first and the second limit switch 43a and 43b of FIG. 4, wherein a first and a second signal are respectively measured from the first and the second limit switch 43a and 43b while the actuator rod 41 of FIG. 4 is moving from the first end point to the second end point.

When the first protrusion 41a of the actuator rod 41 is positioned just below the first limit switch 43a or the second limit switch 43b, an "ON" state of the corresponding signal, i.e., the first or the second signal is provided. On the contrary, an "OFF" state thereof is provided when the first protrusion 41a of the actuator rod 41 is positioned far from the first limit switch 43a or the second limit switch 43b. If the first and the second signal simultaneously show the "ON" state, it indicates, e.g., a failure of the first and/or the second limit switch 43a and 43b. FIG. 9 shows that each of the first and the second signal may be selectively set within a first voltage range from about 2 to 5 V at the "ON" state and within a second voltage range from about 0 to 1 V at the "OFF" state.

While the invention has been shown and described with respect to the preferred embodiment, it will be understood to those skilled in the art that various changes and modifications may be made without departing from the spirit and scope of the invention as defined in the following claims.

What is claimed is:

1. A toe angle adjustment apparatus for a vehicle having a rear cross member, a pair of rear wheels, and a pair of steering knuckles, the apparatus comprising:

an electrical linear actuator fixedly connected to the rear cross member, the electrical linear actuator including a) a housing, b) an electrical motor attached to an end portion of the housing, c) a ball screw disposed inside the housing and rotated by the electrical motor, d) a ball nut operatively mounted on the ball screw for linear movement therealong in response to rotation of the ball screw by the motor, and e) an actuator rod attached to the ball nut;

an interconnection arm pivotally connected with one of the steering knuckles, each knuckle being rotationally coupled with a corresponding rear wheel; and a control lever, rotationally attached to the rear cross member, for interconnecting the interconnection arm with the electrical linear actuator, wherein the electrical linear actuator selectively projects or retracts the control lever, which in turn is rotated about a rotary axis thereof so as to correspondingly retract or project the interconnection arm for the purpose of an active adjustment of a toe angle of the rear wheels, wherein the electrical linear actuator further includes a guide, attached to a lower portion of the housing, and a protrusion positioned on the actuator rod, the guide having a groove along which the protrusion slides.

2. The apparatus of claim 1, wherein the electrical linear actuator further includes a rotation detector for obtaining an angle of rotation of the ball screw.

3. The apparatus of claim 2, wherein the rotation detector has a disk and at least one position sensor.

4. The apparatus of claim 1, wherein the electrical linear actuator further includes a pair of limit switches for electronically defining a stroke thereof.

5. The apparatus of claim 1, wherein the electrical linear actuator further includes a rod stopper, disposed inside the housing, for mechanically preventing an adverse overstroke of the electrical linear actuator.

6. The apparatus of claim 1, wherein the actuator rod is pivotally connected with an end portion of the control lever.

7. The apparatus of claim 1, wherein the electrical motor is a direct current (DC) motor.

* * * * *